(12) United States Patent
Ran et al.

(10) Patent No.: US 9,971,922 B2
(45) Date of Patent: May 15, 2018

(54) FINGERPRINT DETECTION DEVICE AND MOBILE TERMINAL

(71) Applicant: Shenzhen Goodix Technology Co., Ltd., Shenzhen (CN)

(72) Inventors: Rui Ran, Shenzhen (CN); Mengta Yang, Shenzhen (CN); Zhipan Wang, Shenzhen (CN); Jianyang Zhang, Shenzhen (CN); Guangming Zhuo, Shenzhen (CN); Hua Zhong, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 102 days.

(21) Appl. No.: 15/183,784

(22) Filed: Jun. 16, 2016

(65) Prior Publication Data
US 2016/0292488 A1    Oct. 6, 2016

Related U.S. Application Data

(63) Continuation of application No. PCT/CN2014/084516, filed on Aug. 15, 2014.

(30) Foreign Application Priority Data

Dec. 20, 2013  (CN) .......................... 2013 1 0711909

(51) Int. Cl.
*G06K 9/00* (2006.01)
*G06F 3/041* (2006.01)
*G06F 3/044* (2006.01)

(52) U.S. Cl.
CPC ........... *G06K 9/0002* (2013.01); *G06F 3/044* (2013.01); *G06F 3/0416* (2013.01); *G06K 9/0004* (2013.01)

(58) Field of Classification Search
CPC ..... G06F 3/0416; G06F 3/044; G06K 9/0002; G06K 9/0004
See application file for complete search history.

(56) References Cited

U.S. PATENT DOCUMENTS

| 2010/0220900 A1* | 9/2010 | Orsley ................. G06F 3/0421 382/124 |
| 2015/0036065 A1* | 2/2015 | Yousefpor .............. G06K 9/228 349/12 |

FOREIGN PATENT DOCUMENTS

| CN | 1576862 A | 2/2005 |
| CN | 101364155 A | 2/2009 |
| CN | 103745194 A | 4/2014 |

OTHER PUBLICATIONS

Davide Maltoni et al: "Handbook of Fingerprint Recognition, 2nd ed", Jan. 1, 2009, Springer, XP055405408, pp. 67-68.
(Continued)

*Primary Examiner* — Phuoc Tran

(57) ABSTRACT

Disclosed are a fingerprint detection device and a mobile terminal. The fingerprint detection apparatus comprises a capacitive fingerprint sensor and a capacitive touch control chip which is electrically connected to the capacitive fingerprint sensor; wherein the capacitive fingerprint sensor is configured to collect fingerprint information and convert the fingerprint information to an analog signal; and the capacitive touch control chip is configured to convert the analog signal to a digital signal, and generate fingerprint image information according to the digital signal. As compared with the dedicated control chip in the related art, the capacitive touch control chip has mature design and manufacture technique, and thus the manufacture and application costs are lower.

20 Claims, 12 Drawing Sheets

(56) References Cited

OTHER PUBLICATIONS

Achintya K. Bhowmik: "Interactive Displays: Natural Human-Interface Technologies", Jan. 1, 2015, Wiley, XP055405422, pp. 35-51.
Pranav Koundinya: "Integrated Framework for Touch and Fingerprint Sensing: a Unified and an in-Cell Approach", Dec. 1, 2014, University of Houston, XP055404084, pp. 25-36 and p. 53.
Koundinya Pranav et al: "Multi resolution touch panel with built-in fingerprint sensing support", 2014 Design, Automation & Test in Europe Conference & Exhibition (Date), EDAA, Mar. 24, 2014, XP032589476, pp. 1-6.

* cited by examiner though careful comparison and deep study, the inventors
FINGERPRINT DETECTION DEVICE AND MOBILE TERMINAL

CROSS-REFERENCE TO RELATED APPLICATIONS

This application is a continuation application of International Application No. PCT/CN 2014084516, filed on Aug. 15, 2014, which claims priority to Chinese Patent Application No. 201310711909.3, filed on Dec. 20, 2013, both of which are hereby incorporated by reference in their entireties.

TECHNICAL FIELD

The present invention relates to the technical field of fingerprint detection, and in particular, relates to a capacitive fingerprint detection device and a mobile terminal having the fingerprint detection apparatus.

BACKGROUND

Capacitive fingerprint detection apparatuses may be applied in various terminal devices, and at presently are gradually being applied in capacitive touch screen mobile terminals. A conventional capacitive fingerprint detection apparatus comprises a capacitive fingerprint sensor and a control chip. An electrode diagram of the capacitive fingerprint sensor is as illustrated in FIG. 1, which comprises an annular emitter electrode b and a plurality of induction electrodes a. A distribution diagram of the induction electrodes a is as illustrated in FIG. 2, wherein the induction electrodes a are arranged in Cm rows and Rn columns, with the total number being m×n. The control chip needs to have a plurality of signal channels which are respectively connected to the induction electrodes a and the annular emitter electrode b, thereby implementing fingerprint scanning.

A touch control screen module of the capacitive touch control screen mobile terminal is formed by a capacitive touch control chip and capacitive touch control screen electrodes. An electrode diagram of the capacitive touch control screen is as illustrated in FIG. 3, wherein X and Y may be respectively induction electrodes and driving electrodes which are interchangeable. The capacitive touch control chip needs i+j signal channels which are respectively connected to the electrodes X and Y to implement touch control detection.

Through careful comparison and deep study, the inventors of the present invention have identified that the capacitive fingerprint scanning technology is similar to the capacitive touch screen detection technology in terms of the detection scanning method. The design and manufacture techniques of the capacitive touch control chip are relatively mature, and thus the manufacture and application costs are low. The control chip of the capacitive fingerprint detection apparatus is a dedicatedly designed control chip, and the design and manufacture techniques thereof are not mature. Therefore, the manufacture and application costs of such control chip are high.

SUMMARY

An objective of embodiments of the present invention is to provide a fingerprint detection device and a mobile terminal, to reduce the application cost of the fingerprint detection apparatus.

To this end, an embodiment of the present invention provide a fingerprint detection apparatus, comprising a capacitive fingerprint sensor and a capacitive touch control chip which is electrically connected to the capacitive fingerprint sensor; wherein the capacitive fingerprint sensor is configured to collect fingerprint information and convert the fingerprint information to an analog signal; and the capacitive touch control chip is configured to convert the analog signal to a digital signal, and generate fingerprint image information according to the digital signal.

According to one embodiment of the present disclosure, the capacitive fingerprint sensor comprises an annular emitter electrode and a fingerprint scanning analog front end, and the capacitive touch control chip comprises a first analog front end and a first digital logic circuit; wherein the annular emitter electrode is electrically connected to the first analog front end, and the fingerprint scanning analog front end is respectively electrically connected to the first analog front end and the first digital logic circuit.

According to one embodiment of the present disclosure, the first analog front end comprises a driving channel, the driving channel being electrically connected to the annular emitter electrode.

According to one embodiment of the present disclosure, the first analog front end comprises a sensing input channel, and the fingerprint scanning analog front end comprises a second digital logic circuit and an analog signal snubber circuit; wherein the second digital logic circuit is electrically connected to the first digital logic circuit, and the analog signal snubber circuit is electrically connected to the sensing input channel.

According to one embodiment of the present disclosure, the fingerprint scanning analog front end further comprises a row and column analog switch, the row and column analog switch being configured to switch, in a time sharing manner, a scanning region of data scanning performed by the capacitive touch control chip to the capacitive fingerprint sensor.

According to one embodiment of the present disclosure, the capacitive touch control chip comprises an analog-to-digital conversion unit, a processing unit and a fingerprint identification unit; wherein the analog-to-digital conversion unit is configured to convert the analog signal to a digital signal, the processing unit is configured to generate fingerprint image information according to the digital signal, and the fingerprint identification unit is configured to perform fingerprint identification according to the fingerprint image information.

According to one embodiment of the present disclosure, the capacitive fingerprint sensor is provided with a plurality of induction electrodes, the plurality of induction electrodes forming an induction electrode matrix, the induction electrode matrix being circumferentially provided with a compensation electrode.

According to one embodiment of the present disclosure, a plurality of compensation electrodes are provided, and are arranged around the induction electrode matrix; or the compensation electrode is an annular compensation electrode, and is arranged surrounding the induction electrode matrix.

According to one embodiment of the present disclosure, the capacitive fingerprint sensor is provided with an induction electrode matrix which is formed by a plurality of induction electrodes, the capacitive fingerprint sensor reuses the capacitive touch control chip in a time sharing manner such that the capacitive touch control chip performs regional scanning for the sensor electrode matrix in a time sharing manner, wherein the capacitive touch control chip scans at least three induction electrodes each time and reads only data of an induction electrode located at the center of the scanning region.

According to one embodiment of the present disclosure, the capacitive fingerprint sensor comprises an annular emitter electrode, and the capacitive touch control chip is configured to: judge whether the annular emitter electrode is touched; if the annular emitter electrode is not touched, control the capacitive fingerprint sensor to enter a power saving mode; and if the annular emitter electrode is touched, control the capacitive fingerprint sensor to enter an operating mode.

According to one embodiment of the present disclosure, the capacitive touch control chip is configured to detect whether a parasitic capacitance of the annular emitter electrode is a predetermined value; judge that the annular emitter electrode is not touched, if the parasitic capacitance is the predetermined value; and judge that the annular emitter electrode is touched, if the parasitic capacitance is not the predetermined value.

An embodiment of present invention further provides a mobile terminal, which comprises a fingerprint detection apparatus. The fingerprint detection apparatus comprises a capacitive fingerprint sensor and a capacitive touch control chip which is electrically connected to the capacitive fingerprint sensor; wherein the capacitive fingerprint sensor is configured to collect fingerprint information and convert the fingerprint information to an analog signal; and the capacitive touch control chip is configured to convert the analog signal to a digital signal, and generate fingerprint image information according to the digital signal.

According to the fingerprint detection apparatus provided by the embodiment of the present invention, a capacitive touch control chip replaces a dedicated control chip of the conventional fingerprint detection apparatus. As compared with the dedicated control chip, the capacitive touch control chip has mature design and manufacture technique, and thus the manufacture and application costs are lower. Particularly when the fingerprint detection apparatus is applied in a capacitive touch control terminal, the capacitive touch control chip of the capacitive touch control terminal may be reused to achieve detection and identification of the fingerprints, which significantly improves the technical integration and reduces the application cost.

The attainment of the objectives, functional features and advantages of the present invention are further described hereinafter with reference to the specific embodiments and the accompanying drawings.

DETAILED DESCRIPTION

It should be understood that the embodiments described here are only exemplary ones for illustrating the present invention, and are not intended to limit the present invention.

Considering that the capacitive fingerprint scanning technology is similar to the capacitive touch screen detection technology in terms of the detection scanning manner, according to the embodiments of the present invention, a capacitive touch control chip is used to replace a dedicated control chip of the conventional capacitive fingerprint detection apparatus, to thus reduce the application cost. The fingerprint detection apparatus according to the embodiments of the present invention is particularly suitable for a capacitive touch control terminal, and detection and identification of the fingerprints are achieved by reusing the capacitive touch control chip of the capacitive touch control terminal, which significantly improves the technical integration and reduces the application cost.

Figure 1:
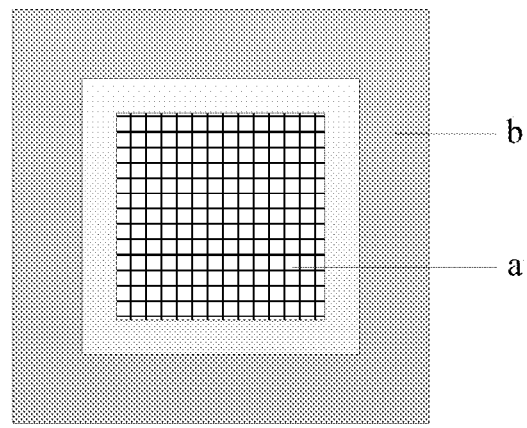
FIG. 1 is an electrode diagram of a capacitive fingerprint sensor.
Figure 2:
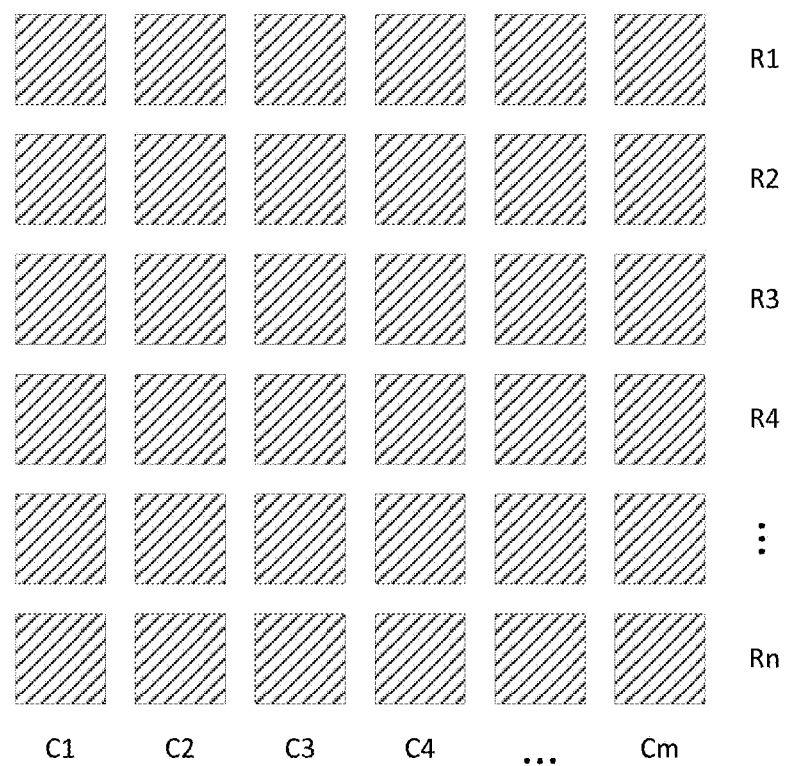
FIG. 2 is a diagram illustrating distribution of induction electrodes of the capacitive fingerprint sensor.
Figure 3:
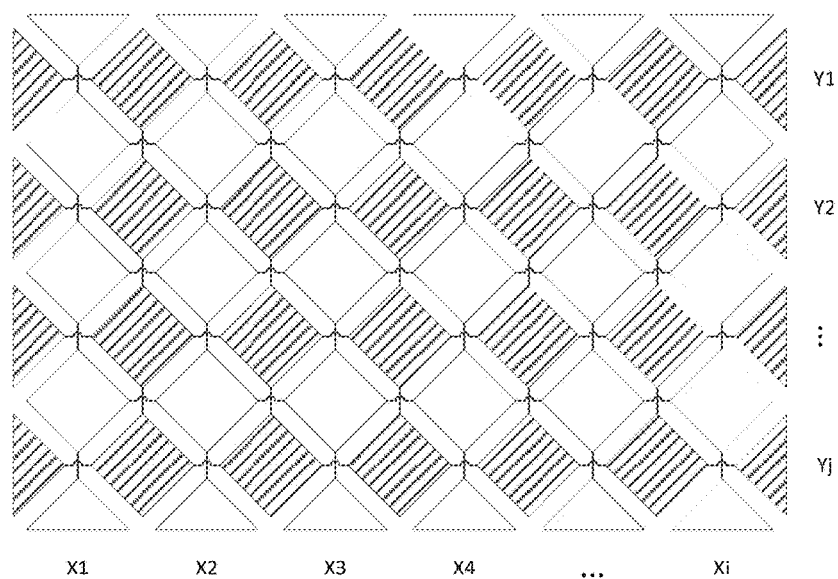
FIG. 3 is an electrode diagram of a capacitive touch screen module.
Figure 4:
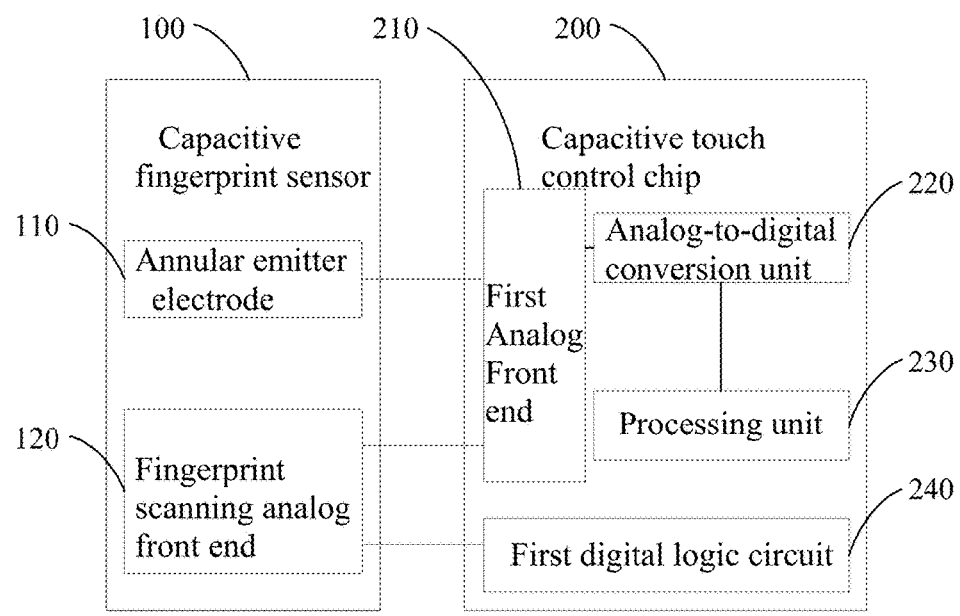
FIG. 4 is a structural block diagram illustrating a fingerprint detection apparatus according to a first embodiment of the present invention.
Figure 5:
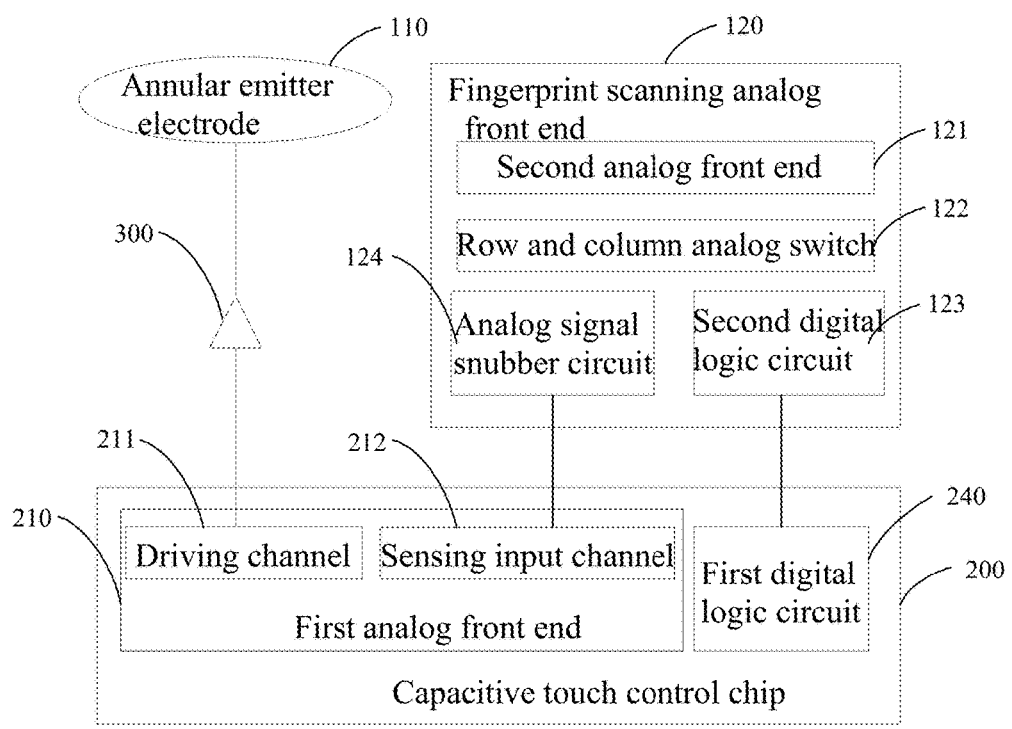
FIG. 5 is a schematic diagram illustrating circuit connection of a capacitive fingerprint sensor and a capacitive touch control chip as illustrated in FIG. 4.

Referring to FIG. 4 and FIG. 5, a first embodiment of the present invention provides a fingerprint detection apparatus. The fingerprint detection apparatus comprises a capacitive fingerprint sensor 100 and a capacitive touch control chip 200. The capacitive fingerprint sensor 100 is configured to collect fingerprint information, and convert the fingerprint information to an analog signal. The capacitive touch control chip 200 is configured to convert the analog signal to a digital signal, and generate fingerprint image information according to the digital signal.

The capacitive fingerprint sensor 100 comprises an annular emitter electrode 110 and a fingerprint scanning analog front end 120. The fingerprint scanning analog front end 120 comprises an induction electrode matrix formed by a plurality of induction electrodes, and an amplification circuit and the like auxiliary circuits. The annular emitter electrode 110 surrounds the induction electrode matrix. The induction electrode matrix comprises a second analog front end 121, a second digital logic circuit 123 and an analog signal snubber circuit 124. The capacitive touch control chip 200 comprises a first analog front end 210, a first digital logic circuit 240, an analog-to-digital conversion unit 220 and a processing unit 230. The first analog front end 210 comprises a driving channel 211 and a sensing input channel 212. The annular emitter electrode 110 is electrically connected to the driving channel 211 of the first analog front end 210. In this embodiment, the annular emitter electrode 110 is electrically connected to the driving channel 211 via a driving snubber circuit 300. In some embodiments, the annular emitter electrode 110 may also be directly electrically connected to the driving channel 211. The second digital logic circuit 123 of the fingerprint scanning analog front end 120 is electrically connected to the first digital logic circuit 240 of the capacitive touch control chip 200. The analog signal snubber circuit 124 of the fingerprint scanning analog front end 120 is electrically connected to the sensing input channel 212 of the first analog front end 210.

The fingerprint scanning analog front end 120 of the capacitive fingerprint sensor 100 collects fingerprint information, and converts the fingerprint information to an analog signal. The first analog front end 210 of the capacitive touch control chip 200 acquires the analog signal via the sensing input channel 212, and transfers the analog signal to the analog-to-digital conversion unit 220. The analog-to-digital conversion unit 220 converts the analog signal to a digital signal, and transfers the digital signal to the processing unit 230. The processing unit 230 generates fingerprint image information according to the digital signal, thereby completing detection of the fingerprint.

Further, since the capacitive fingerprint sensor 100 comprises a plurality of induction electrodes and the capacitive touch control chip 200 comprises a few sensing input channels 212, the capacitive touch control chip 200 may acquire, by means of multiple times of scanning, the fingerprint information collected by the capacitive fingerprint sensor 100. Accordingly, in this embodiment, the induction electrode matrix of the fingerprint scanning analog front end 120 further comprises a row and column analog switch 122. The row and column analog switch 122 is configured to switch, in a time sharing manner, a scanning region of data scanning performed by the capacitive touch control chip 200 to the capacitive fingerprint sensor 100. As such, the capacitive fingerprint sensor 100 may reuse the capacitive touch control chip 200 in a time sharing manner, such that the capacitive touch control chip 200 performs regional scanning for the induction electrode matrix in a time sharing manner, to finally acquire overall fingerprint information collected by all the induction electrodes.

Figure 6:
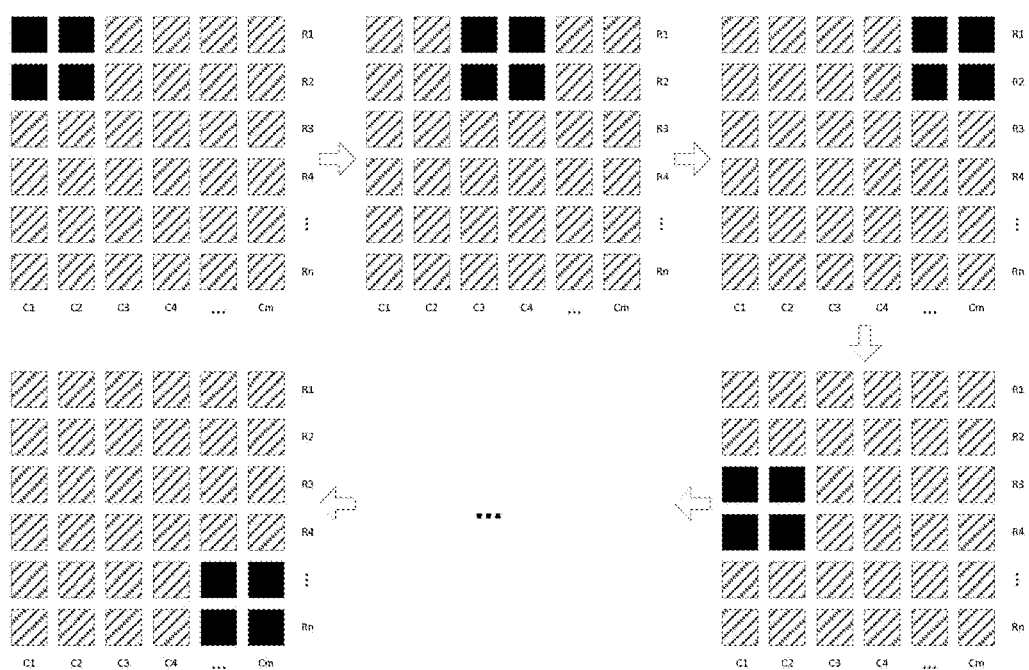
FIG. 6 is a schematic diagram illustrating time sharing-based scanning of the fingerprint detection apparatus according to an embodiment of the present invention.
Figure 7:
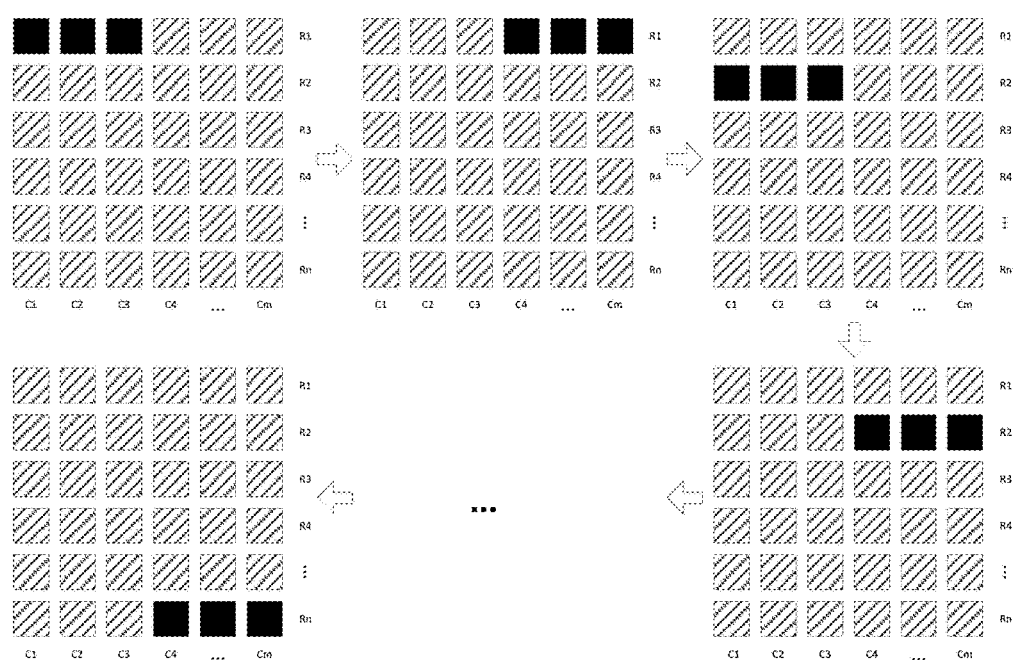
FIG. 7 is another schematic diagram illustrating time sharing-based scanning of the fingerprint detection apparatus according to an embodiment of the present invention.

The time sharing-based scanning method may be as illustrated in FIG. 6, wherein the black blocks represent induction electrodes that are being scanned, and the shadow blocks represent induction electrodes that are not operating. Each time four induction electrodes that are arranged in a rectangular shape are scanned, and the scanning is performed from the upper left corner of an induction electrode matrix to the lower right corner thereof (or based on another scanning sequence), until all the induction electrodes are scanned and all the fingerprint information is read. The time sharing-based scanning method may also be as illustrated in FIG. 7. Each time three induction electrodes that are parallelly arranged in a line are scanned, and the scanning is performed from the upper left corner of an induction electrode matrix to the lower right corner thereof (or based on another scanning sequence), until all the induction electrodes are scanned and all the fingerprint information is read. The time sharing-based scanning method may be practiced in other ways according to the actual needs, which is not limited herein.

Figure 8:
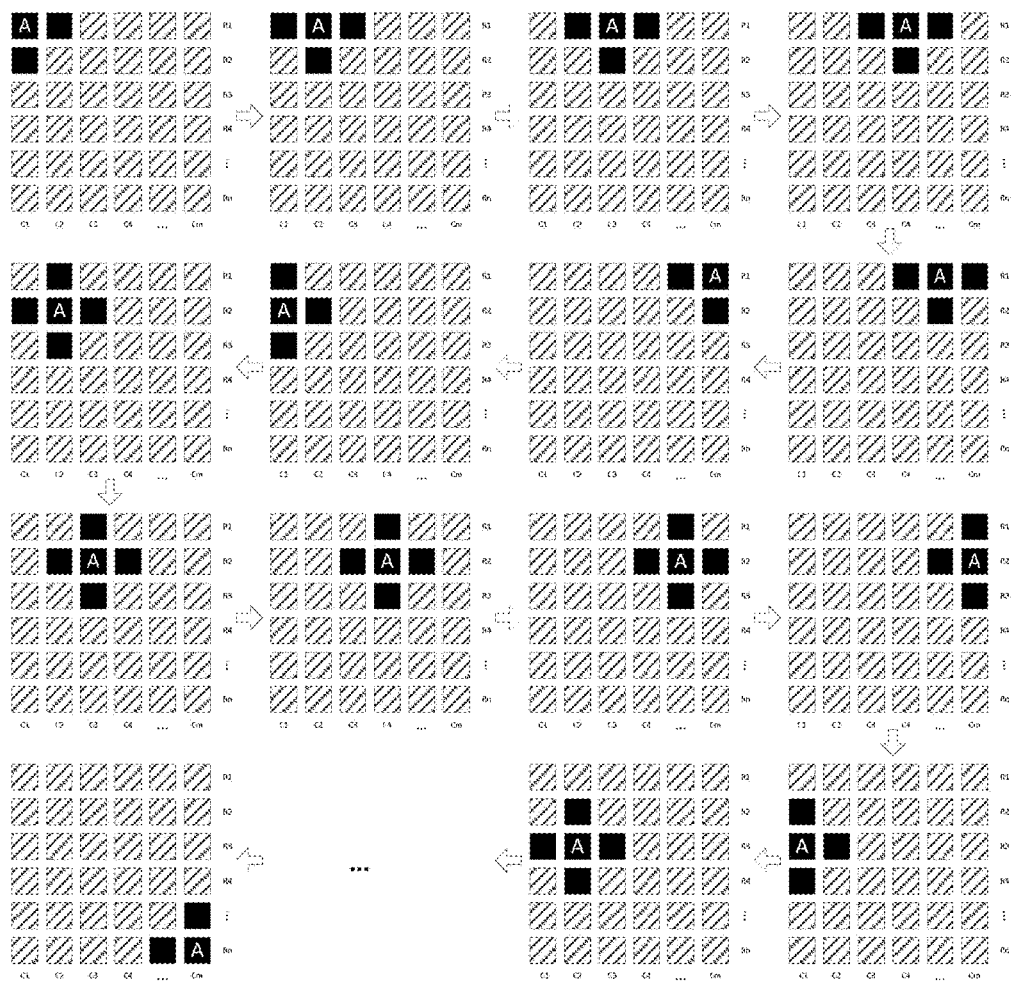
FIG. 8 is a schematic diagram illustrating electric field compensative time sharing-based scanning of the fingerprint detection apparatus according to an embodiment of the present invention.

Further, during the time sharing-based scanning, to save power, the induction electrodes represented by the shadow blocks generally do not operate. As such, the electric field of the induction electrodes represented by the black blocks is different from the electric field of the induction electrodes represented by the shadow blocks. To mitigate the impacts caused by the induction electrodes represented by the shadow blocks to the induction electrodes represented by the black blocks, the capacitive touch control chip 200 scans at least three induction electrodes each time, and each time the capacitive touch control chip 200 only reads data of the induction electrodes at the center of the scanning region, until data of all the induction electrodes is read and all the fingerprint information is acquired. That is, as illustrated in FIG. 8, the black blocks represent the scanning regions. During scanning of the four corners of the induction electrode matrix, each time only three induction electrodes need to be scanned; during scanning of the edges of the induction electrode matrix, each time only four induction electrodes need to be scanned; during scanning of the middle part of the induction electrode matrix, each time only five induction electrodes need to be scanned. The capacitive touch control chip 200 reads data of an induction electrode A at the center of the scanning region each time, and the other induction electrodes are only used as compensation electrodes to buffer the impact caused by the induction electrodes represented by the shadow blocks to the electric field of the induction electrodes in the scanning region. As such, the acquired fingerprint information is more accurate and stable, and the generated fingerprint image is better in quality.

Figure 9:
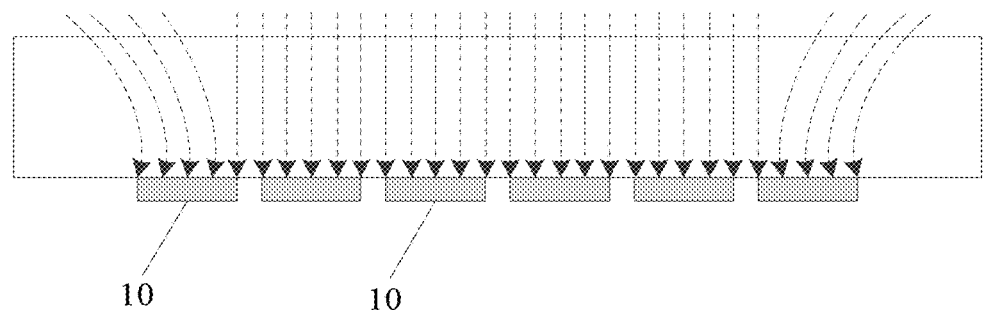
FIG. 9 is a diagram illustrating electric field distribution of induction electrodes of a capacitive fingerprint sensor in the prior art.
Figure 10:
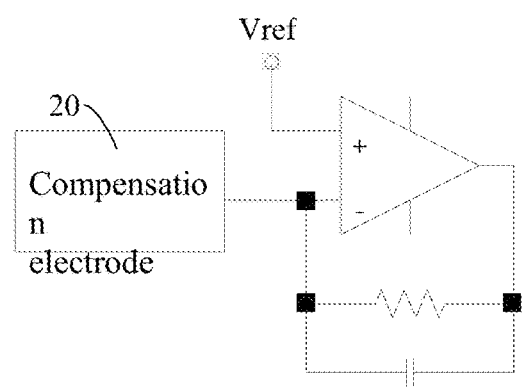
FIG. 10 is a schematic diagram illustrating circuit connection of a compensation electrode of the fingerprint detection apparatus according to an embodiment of the present invention.
Figure 11:
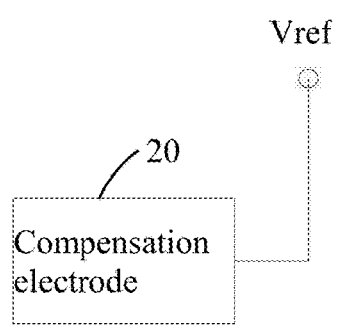
FIG. 11 is another schematic diagram illustrating circuit connection of the compensation electrode of the fingerprint detection apparatus according to an embodiment of the present invention.
Figure 12:
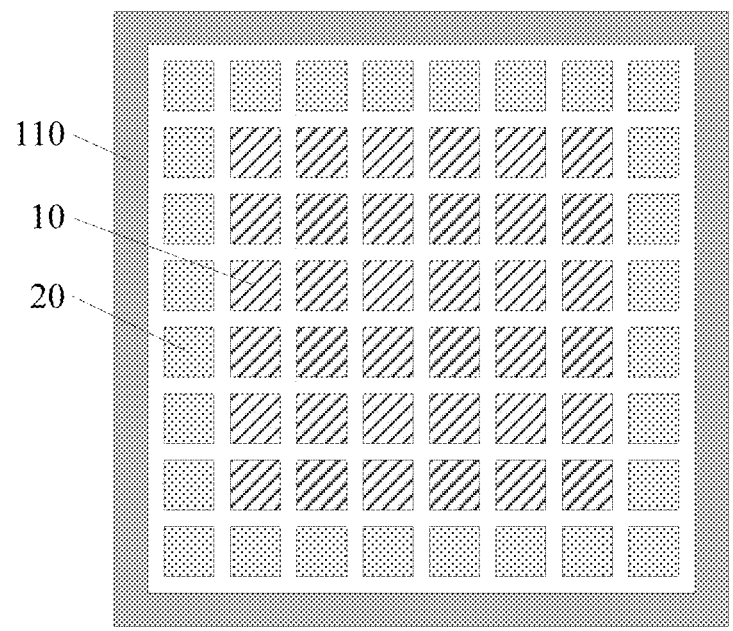
FIG. 12 is a schematic diagram illustrating configuration of compensation electrodes of the fingerprint detection apparatus according to an embodiment of the present invention.
Figure 13:
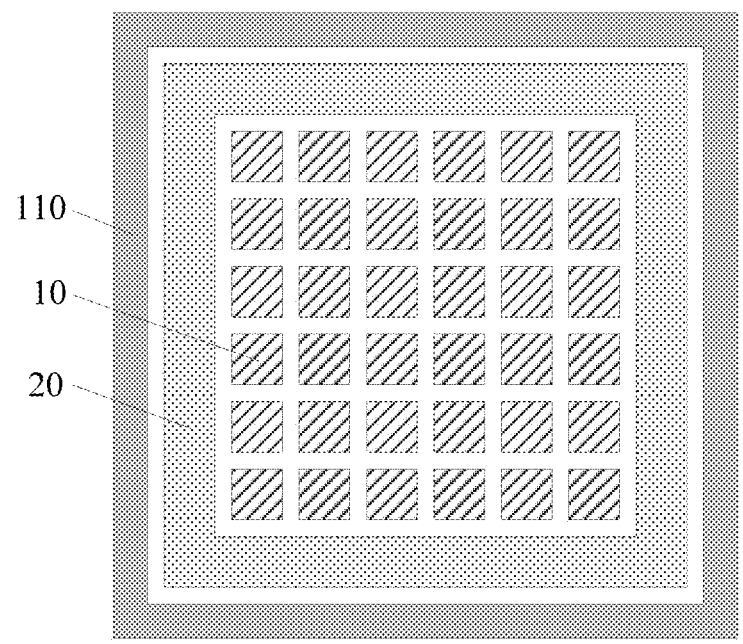
FIG. 13 is another schematic diagram illustrating configuration of the compensation electrode of the fingerprint detection apparatus according to an embodiment of the present invention.
Figure 14:
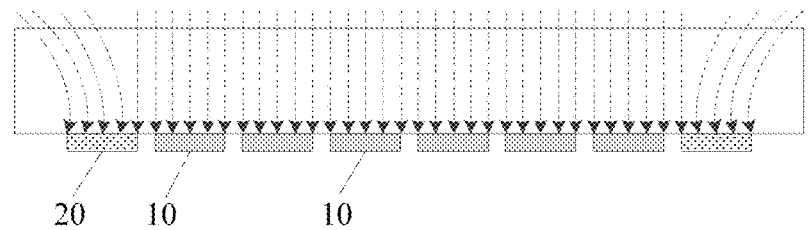
FIG. 14 is a diagram illustrating electric field distribution of the induction electrodes of the capacitive fingerprint sensor according to an embodiment of the present invention.

Further, the physical law of electric field distribution determines that the electric field of the edges of the induction electrode matrix is different from the electric field of the middle part of the induction electrode matrix of the capacitive fingerprint sensor 100. As illustrated in FIG. 9, at the middle part of the induction electrode matrix, the electric field distribution of induction electrodes 10 is uniform, whereas the electric field distribution of the induction electrodes 10 at the edges of is divergent. As a result, the acquired fingerprint image may be subjected to distortion at the edges of the image. To solve this problem, as illustrated in FIG. 10 to FIG. 14, in this embodiment, compensation electrodes 20 are arranged around the induction electrode matrix. The compensation electrodes 20 are not used for signal detection and output no data, but only cause the signal characteristic to be equivalent to the induction electrodes 10 in terms of circuit design. A circuit diagram of the compensation electrodes 20 may be as illustrated in FIG. 10 or FIG. 11. The compensation electrodes 20 may be arranged in a plurality of manners. To be specific, as illustrated in FIG. 12, a plurality of compensation electrodes 20 may be arranged, wherein each of the compensation electrodes 20 has the same size as the induction electrode 10, and the compensation electrodes 20 may be uniformly distributed around the induction electrode matrix and arranged between the annular emitter electrode 110 and the induction electrode 10. In some embodiments, each of the compensation electrodes 20 may have a length that is twice or three times or the like of the length of induction electrode 10. Optionally, as illustrated in FIG. 13, an annular compensation electrode 20 may be arranged, which surrounds the induction electrode matrix and arranged between the annular emitter electrode 110 and the induction electrode 10. In some embodiments, the compensation electrodes may be arranged in two or more laps. After the compensation electrode 20 is added, the electric field distribution of the induction electrode 10 is as illustrated in FIG. 14. The electric field at the edges of the induction electrode matrix is similarly uniform as the electric field at the middle part of the induction electrode matrix, which greatly improves the quality of the collected fingerprint image.

Further, to save power and reduce power consumption, in this embodiment, the capacitive touch control chip 200 controls the capacitive fingerprint sensor 100 to enter a power saving mode or an operating mode by judging whether the capacitive fingerprint sensor 100 is in an idle state or a using state. When it is judged that the capacitive fingerprint sensor 100 is in the idle state, the capacitive touch control chip 200 controls the capacitive fingerprint sensor 100 to enter the power saving mode, that is, disables the fingerprint scanning function of the capacitive fingerprint sensor 100 and stops the fingerprint scanning, thereby saving power. When it is judged that the capacitive fingerprint sensor 100 is in the using state, the capacitive touch control chip 200 controls the capacitive fingerprint sensor 100 to enter the operating mode, that is, quickly enables the fingerprint scanning function of the capacitive fingerprint sensor 100 and performs the fingerprint scanning.

Figure 15:
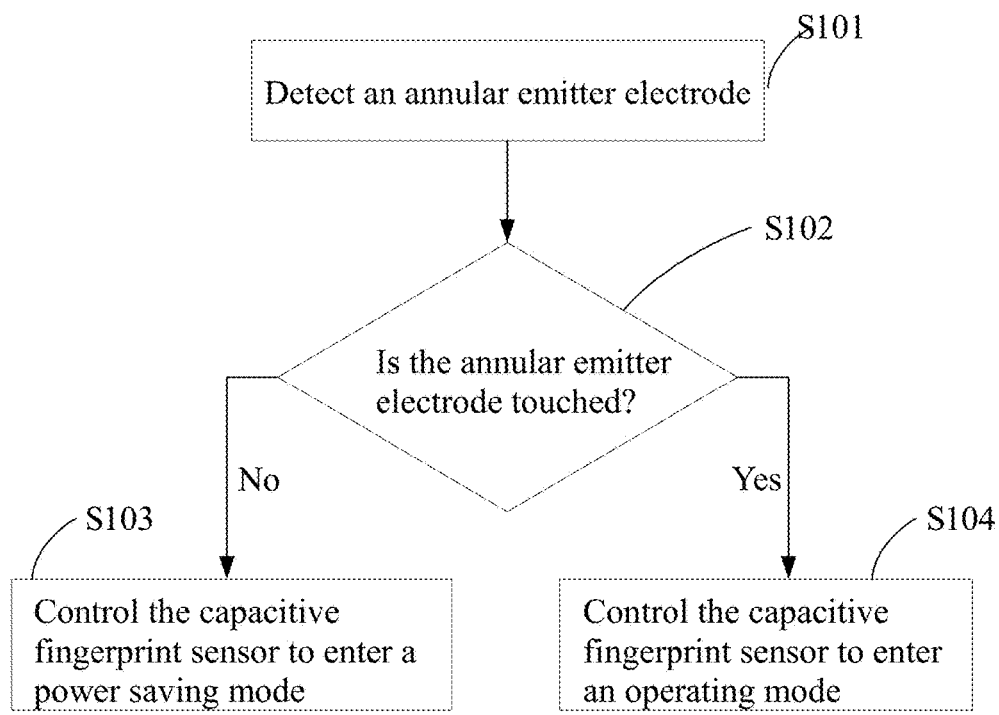
FIG. 15 is a flowchart illustrating a power saving method of the fingerprint detection apparatus according to an embodiment of the present invention.

Specifically, the capacitive touch control chip is configured to: judge whether the annular emitter electrode is touched; if the annular emitter electrode is not touched, control the capacitive fingerprint sensor to enter the power saving mode; and if the annular emitter electrode is touched, control the capacitive fingerprint sensor to enter the operating mode. The specific control process is as illustrated in FIG. 15, and comprises the following steps:

Step S101: An annular emitter electrode is detected.

The capacitive touch control chip judges whether the capacitive fingerprint sensor is currently in an idle state or a using state by detecting in real time the annular emitter electrode of the capacitive fingerprint sensor.

Step S102: It is judged whether the annular emitter electrode is touched.

When a user performs fingerprint scanning by using the capacitive fingerprint sensor, the user would definitely touch the annular emitter electrode. In this case, the capacitive touch control chip judges whether the capacitive fingerprint sensor is in the idle state or the using state by judging whether the annular emitter electrode is touched. If it is judged that the annular emitter electrode is not touched, step S103 is performed; and if it is judged that the annular emitter electrode is touched, step S104 is performed.

Figure 16:
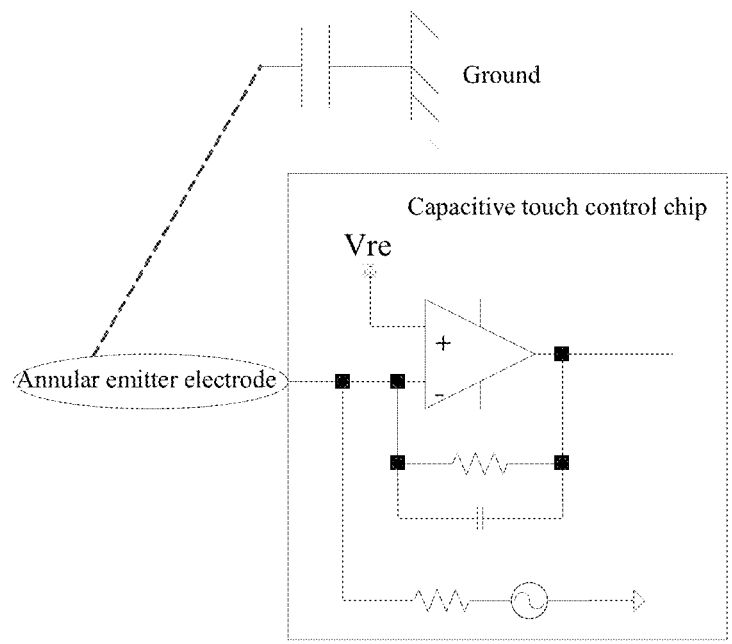
FIG. 16 is a circuit diagram illustrating detection of an annular emitter electrode according to an embodiment of the present invention.
Figure 17:
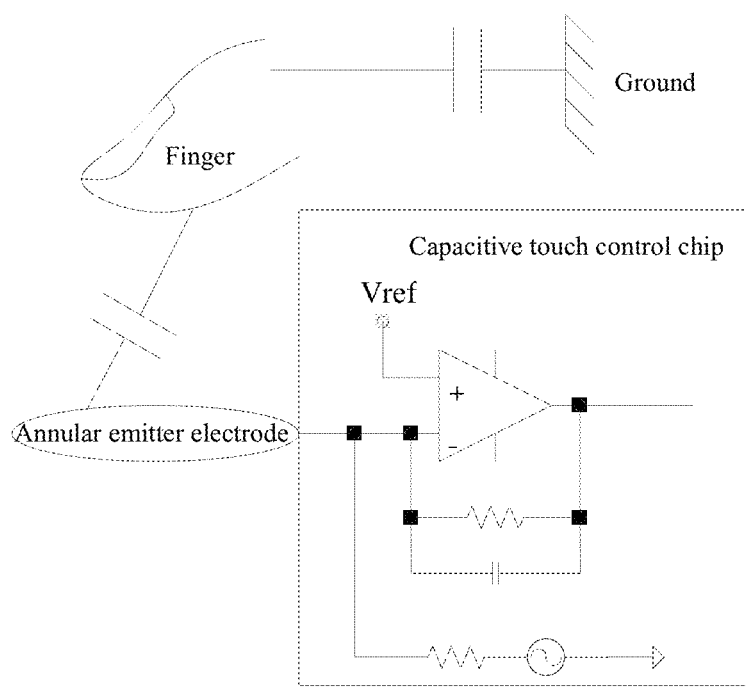
FIG. 17 is a schematic diagram illustrating touching an annular emitter electrode in FIG. 17 by a finger.
Figure 18:
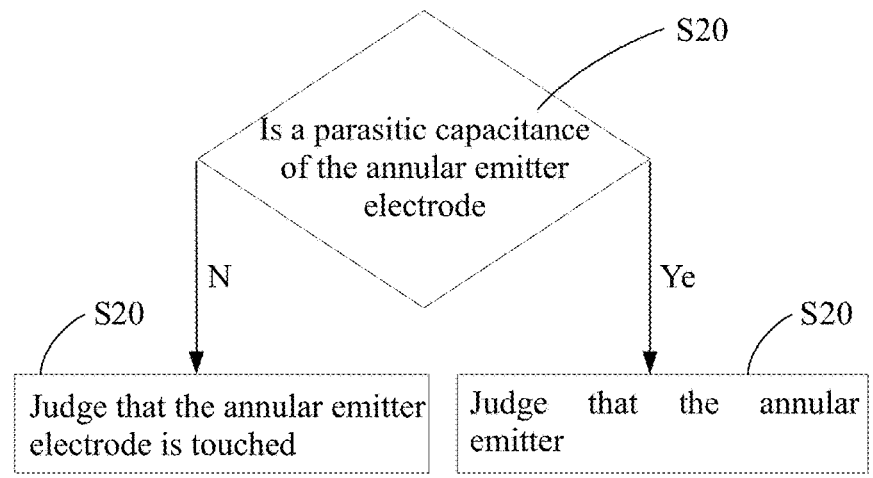
FIG. 18 is a specific flowchart illustrating step S102 in FIG. 15.

A circuit connection diagram of the capacitive touch control chip and the annular emitter electrode is as illustrated in FIG. 16. In a normal state, the parasitic capacitance of the annular emitter electrode to the remote ground is constant. As illustrated in FIG. 17, when the annular emitter electrode is touched by a finger, the parasitic capacitance of the annular emitter electrode to the remote ground may be changed. Therefore, it may be judged according to the above principle whether the annular emitter electrode is touched. That is, the capacitive touch control chip is configured to: detect whether the parasitic capacitance of the annular emitter electrode is a predetermined value; if the parasitic capacitance is the predetermined value, judge that the annular emitter electrode is not touched; and if the parasitic capacitance is not the predetermined value, judge that the annular emitter electrode is touched. The specific judgment process is as illustrated in FIG. 18, and comprises the following steps:

Step S201: It is judged whether a parasitic capacitance of the annular emitter electrode is a predetermined value.

In a normal state, the parasitic capacitance of the annular emitter electrode to the remote ground is constant, and the constant value is prestored as the predetermined value. The capacitive touch control chip detects a current parasitic capacitance of the annular emitter electrode. If the parasitic capacitance is the predetermined value, step S202 is performed; and if the parasitic capacitance is changed and is not the predetermined value, step S203 is performed.

Step S202: It is judged that the annular emitter electrode is not touched.

If the capacitive touch control chip detects that the current parasitic capacitance of the annular emitter electrode is the predetermined value, the capacitive touch control chip judges that the annular emitter electrode is not touched.

Step S203: It is judged that the annular emitter electrode is touched.

If the capacitive touch control chip detects that the current parasitic capacitance of the annular emitter electrode is not the predetermined value, the capacitive touch control chip judges that the annular emitter electrode is touched.

In this way, by detection of the parasitic capacitance of the annular emitter electrode, a judgment is made on whether the annular emitter electrode is touched. The above function may also be used as a virtual keyboard function.

Step S103: The capacitive fingerprint sensor is controlled to enter a power saving mode.

When it is judged that the annular emitter electrode is not touched, it indicates that the user does not use the fingerprint detection function, and the capacitive fingerprint sensor is in an idle state. To save power, the capacitive touch control chip controls the capacitive fingerprint sensor to enter the power saving mode, and disables the fingerprint scanning function of the capacitive fingerprint sensor and stops the fingerprint scanning. Subsequently, the process returns to step S101, and the capacitive touch control chip continuously performs real-time detection for the annular emitter electrode of the capacitive fingerprint sensor.

Step S104: The capacitive fingerprint sensor is controlled to enter an operating mode.

When it is judged that the annular emitter electrode is touched, it indicates that the user is using the fingerprint detection function, and the capacitive fingerprint sensor is in a using state. In this case, the capacitive touch control chip controls the capacitive fingerprint sensor to enter the operating mode. That is, the fingerprint scanning function of the capacitive fingerprint sensor is quickly enabled to perform the fingerprint scanning, and the capacitive touch control chip generates and outputs a fingerprint image. Upon completion of the fingerprint scanning, the capacitive touch control chip returns to step S101, and continuously performs real-time detection for the annular emitter electrode of the capacitive fingerprint sensor.

The capacitive touch control chip may implement real-time detection and control of the capacitive fingerprint sensor by using a control unit.

With the fingerprint detection apparatus according to this embodiment, a fingerprint image is acquired upon the fingerprint scanning and then the fingerprint image is transmitted to a control chip of a terminal device, such that the control chip performs fingerprint identification and identity information authentication according to the fingerprint image.

Figure 19:
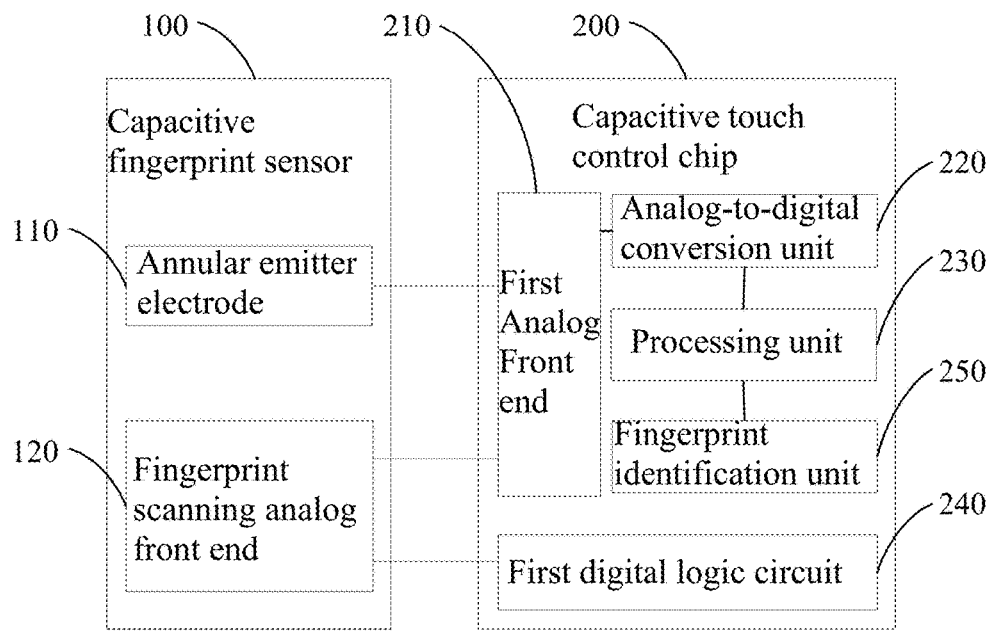
FIG. 19 is a structural block diagram illustrating a fingerprint detection apparatus according to a second embodiment of the present invention.

As illustrated in FIG. 19, the capacitive touch control chip 200 may be further integrated with a fingerprint identification unit 250, wherein the fingerprint identification unit 250 is configured to perform fingerprint identification according to the fingerprint image information to achieve identity authentication. In this way, the fingerprint detection apparatus may simultaneously implement the detection function and identification function for the fingerprint. That is, the fingerprint detection apparatus may not only scan the fingerprint to acquire a fingerprint image, but also perform fingerprint identification according to the fingerprint image to implement identity information authentication.

Figure 20:
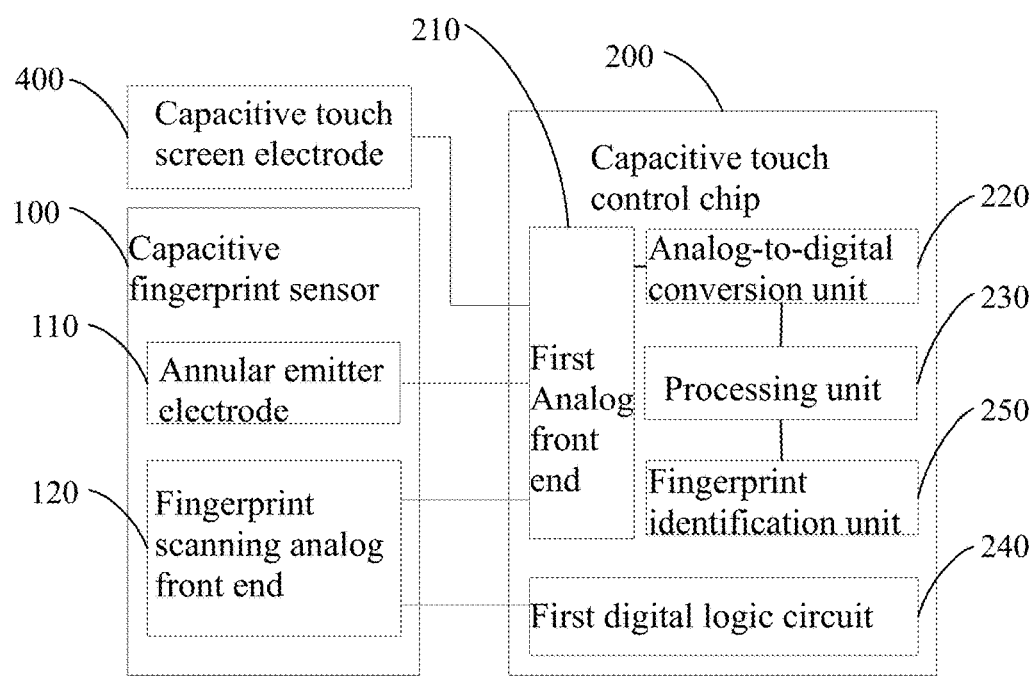
FIG. 20 is a schematic structural block diagram illustrating a fingerprint detection apparatus according to a third embodiment of the present invention.

As illustrated in FIG. 20, when the terminal device is a capacitive touch control terminal, a capacitive touch control electrode 400 and the capacitive fingerprint sensor 100 may reuse the same capacitive touch control chip 200, which greatly improves the technical integration and reduces the application cost.

Accordingly, the fingerprint detection apparatus according to the embodiments of the present invention has the following advantages:

(1) A capacitive touch control chip replaces a dedicated control chip of the conventional fingerprint detection apparatus. As compared with the dedicated control chip, the capacitive touch control chip has mature design and manufacture technique, and thus the manufacture and application costs are lower. Particularly when the fingerprint detection apparatus is applied in a capacitive touch control terminal, the capacitive touch control chip of the capacitive touch control terminal may be reused to achieve detection and identification of the fingerprint, which significantly improves the technical integration and reduces the application cost.

(2) The capacitive fingerprint sensor reuses the capacitive touch control chip in a time sharing manner, such that the capacitive touch control chip performs regional scanning for the induction electrode matrix in a time sharing manner, and finally acquires all the fingerprint information collected by all the induction electrodes. As such, the capacitive touch control chip is capable of acquiring a quality fingerprint image by using fewer sensing input channels, reaching a balance between cost and quality.

(3) During the time sharing-based scanning, the capacitive touch control chip only reads data of the induction electrodes at the center of the scanning region each time, and the other induction electrodes are used as compensation electrodes to buffer the impact caused by the induction electrodes represented by the shadow blocks to the electric field of the induction electrodes in the scanning region. As such, the acquired fingerprint information is more accurate and stable, and the quality of the generated fingerprint image is significantly improved.

(4) The problem that the electric field distribution at the edges of the induction electrode matrix is divergent is solved by arranging compensation electrodes around the induction electrode matrix to achieve electric field compensation, such that the electric field at the edges of the induction electrode matrix is similarly uniform as the electric field at the middle part of the induction electrode matrix, which greatly improves the quality of the collected fingerprint image and thus enhances the overall quality of the fingerprint image.

(5) The capacitive touch control chip controls the capacitive fingerprint sensor to enter the operating mode or the power saving mode by detecting in real time whether the annular emitter electrode of the capacitive fingerprint sensor is touched, which saves the power and reduces the power consumption.

An embodiment of the present invention further provides a mobile terminal, which comprises a fingerprint detection apparatus. The fingerprint detection apparatus comprises a capacitive fingerprint sensor and a capacitive touch control chip which is electrically connected to the capacitive fingerprint sensor; wherein the capacitive fingerprint sensor is configured to collect fingerprint information and convert the fingerprint information to an analog signal; and the capacitive touch control chip is configured to convert the analog signal to a digital signal, and generate fingerprint image information according to the digital signal. The fingerprint detection apparatus described in this embodiment is the fingerprint detection apparatus involved in the above embodiment of the present invention, which is thus not described herein any further.

The mobile terminal according to the embodiment of the present invention is equipped with the above fingerprint detection apparatus, wherein a capacitive touch control chip replaces a dedicated control chip of the conventional fingerprint detection apparatus. As compared with the dedicated control chip, the capacitive touch control chip has mature design and manufacture technique, and thus the manufacture and application costs are lower. Particularly when the mobile terminal is a capacitive touch control terminal, the capacitive touch control chip of the capacitive touch control terminal may be reused to achieve detection and identification of the fingerprint, which significantly improves the technical integration and reduces the application cost.

It should be understood that described above are exemplary embodiments of the present invention, but are not intended to limit the scope of the present invention. Any equivalent structure or equivalent process variation made based on the specification and drawings of the present invention, which is directly or indirectly applied in other related technical fields, fall within the scope of the present invention.

What is claimed is:

1. A fingerprint detection apparatus, comprising:
 a capacitive fingerprint sensor configured to collect fingerprint information and convert the fingerprint information to an analog signal; and
 a capacitive touch control chip which is electrically connected to the capacitive fingerprint sensor and configured to convert the analog signal to a digital signal, and generate fingerprint image information according to the digital signal, wherein the capacitive fingerprint sensor comprises a fingerprint scanning analog front end, the capacitive touch control chip comprises a first analog front end and a first digital logic circuit, and the fingerprint scanning analog front end is respectively electrically connected to the first analog front end and the first digital logic circuit.

2. The fingerprint detection apparatus according to claim 1, wherein:
the capacitive fingerprint sensor comprises an annular emitter electrode; and
wherein the annular emitter electrode is electrically connected to the first analog front end.

3. The fingerprint detection apparatus according to claim 2, wherein the first analog front end comprises a driving channel, the driving channel being electrically connected to the annular emitter electrode.

4. The fingerprint detection apparatus according to claim 3, wherein:
the first analog front end comprises a sensing input channel; and
the fingerprint scanning analog front end comprises a second digital logic circuit and an analog signal snubber circuit;
wherein the second digital logic circuit is electrically connected to the first digital logic circuit, and the analog signal snubber circuit is electrically connected to the sensing input channel.

5. The fingerprint detection apparatus according to claim 4, wherein the fingerprint scanning analog front end further comprises a row and column analog switch, the row and column analog switch being configured to switch, in a time sharing manner, a scanning region of data scanning performed by the capacitive touch control chip to the capacitive fingerprint sensor.

6. The fingerprint detection apparatus according to claim 3, wherein the capacitive touch control chip comprises an analog-to-digital conversion unit, a processing unit and a fingerprint identification unit; wherein the analog-to-digital conversion unit is configured to convert the analog signal to a digital signal, the processing unit is configured to generate fingerprint image information according to the digital signal, and the fingerprint identification unit is configured to perform fingerprint identification according to the fingerprint image information.

7. The fingerprint detection apparatus according to claim 3, wherein the capacitive fingerprint sensor is provided with a plurality of induction electrodes; the plurality of induction electrodes forming an induction electrode matrix; and the induction electrode matrix being circumferentially provided with a compensation electrode.

8. The fingerprint detection apparatus according to claim 7, wherein:
a plurality of compensation electrodes is provided and arranged around the induction electrode matrix; or
the compensation electrode is an annular compensation electrode and is arranged surrounding the induction electrode matrix.

9. The fingerprint detection apparatus according to claim 3,
wherein the capacitive fingerprint sensor is provided with an induction electrode matrix which is formed by a plurality of induction electrodes;
wherein the capacitive fingerprint sensor reuses the capacitive touch control chip in a time sharing manner such that the capacitive touch control chip performs regional scanning for the sensor electrode matrix in a time sharing manner; and
wherein the capacitive touch control chip scans at least three induction electrodes each time and reads only data of an induction electrode located at the center of the scanning region.

10. The fingerprint detection apparatus according to claim 2, wherein:
the first analog front end comprises a sensing input channel; and
the fingerprint scanning analog front end comprises a second digital logic circuit and an analog signal snubber circuit;
wherein the second digital logic circuit is electrically connected to the first digital logic circuit, and the analog signal snubber circuit is electrically connected to the sensing input channel.

11. The fingerprint detection apparatus according to claim 2, wherein the capacitive touch control chip comprises an analog-to-digital conversion unit, a processing unit and a fingerprint identification unit; wherein the analog-to-digital conversion unit is configured to convert the analog signal to a digital signal, the processing unit is configured to generate fingerprint image information according to the digital signal, and the fingerprint identification unit is configured to perform fingerprint identification according to the fingerprint image information.

12. The fingerprint detection apparatus according to claim 2, wherein the capacitive fingerprint sensor is provided with a plurality of induction electrodes; the plurality of induction electrodes forming an induction electrode matrix; and the induction electrode matrix being circumferentially provided with a compensation electrode.

13. The fingerprint detection apparatus according to claim 2,
wherein the capacitive fingerprint sensor is provided with an induction electrode matrix which is formed by a plurality of induction electrodes;
wherein the capacitive fingerprint sensor reuses the capacitive touch control chip in a time sharing manner such that the capacitive touch control chip performs regional scanning for the sensor electrode matrix in a time sharing manner; and
wherein the capacitive touch control chip scans at least three induction electrodes each time and reads only data of an induction electrode located at the center of the scanning region.

14. The fingerprint detection apparatus according to claim 1, wherein the capacitive touch control chip comprises an analog-to-digital conversion unit, a processing unit and a fingerprint identification unit; wherein the analog-to-digital conversion unit is configured to convert the analog signal to a digital signal, the processing unit is configured to generate fingerprint image information according to the digital signal, and the fingerprint identification unit is configured to perform fingerprint identification according to the fingerprint image information.

15. The fingerprint detection apparatus according to claim 1, wherein the capacitive fingerprint sensor is provided with a plurality of induction electrodes; the plurality of induction electrodes forming an induction electrode matrix; and the induction electrode matrix being circumferentially provided with a compensation electrode.

16. The fingerprint detection apparatus according to claim 1,
wherein the capacitive fingerprint sensor is provided with an induction electrode matrix which is formed by a plurality of induction electrodes;
wherein the capacitive fingerprint sensor reuses the capacitive touch control chip in a time sharing manner such that the capacitive touch control chip performs regional scanning for the sensor electrode matrix in a time sharing manner; and wherein the capacitive touch control chip scans at least three induction electrodes each time and reads only data of an induction electrode located at the center of the scanning region.

17. The fingerprint detection apparatus according to claim 1, wherein the capacitive fingerprint sensor comprises an annular emitter electrode, and the capacitive touch control chip is configured to:

judge whether the annular emitter electrode is touched;

control the capacitive fingerprint sensor to enter a power saving mode, if the annular emitter electrode is not touched; and control the capacitive fingerprint sensor to enter an operating mode, if the annular emitter electrode is touched.

18. The fingerprint detection apparatus according to claim 17, wherein the capacitive touch control chip is configured to:

detect whether a parasitic capacitance of the annular emitter electrode is a predetermined value;

judge that the annular emitter electrode is not touched, if the parasitic capacitance is the predetermined value; and judge that the annular emitter electrode is touched, if the parasitic capacitance is not the predetermined value.

19. A mobile terminal, comprising:

a fingerprint detection apparatus, wherein the fingerprint detection apparatus comprises:

a capacitive fingerprint sensor configured to collect fingerprint information and convert the fingerprint information to an analog signal; and a capacitive touch control chip which is electrically connected to the capacitive fingerprint sensor, and configured to convert the analog signal to a digital signal and generate fingerprint image information according to the digital signal, wherein the capacitive fingerprint sensor comprises a fingerprint scanning analog front end, the capacitive touch control chip comprises a first analog front end and a first digital logic circuit, and the fingerprint scanning analog front end is respectively electrically connected to the first analog front end and the first digital logic circuit.

20. The mobile terminal according to claim 19, wherein the capacitive fingerprint sensor is provided with a plurality of induction electrodes; the plurality of induction electrodes forming an induction electrode matrix; and the induction electrode matrix being circumferentially provided with a compensation electrode.

* * * * *